United States Patent
Aveline et al.

(10) Patent No.: US 9,942,632 B2
(45) Date of Patent: Apr. 10, 2018

(54) PHOTONIC RADIOFREQUENCY SIGNAL CROSS-CONNECT AND FREQUENCY CONVERSION DEVICE AND SPACE-BORNE TELECOMMUNICATIONS PAYLOAD COMPRISING SUCH A DEVICE

(71) Applicant: THALES, Courbevoie (FR)

(72) Inventors: Muriel Aveline, Toulouse (FR); Benoit Benazet, Toulouse (FR); Michel Sotom, Toulouse (FR)

(73) Assignee: THALES, Courbevoie (FR)

( * ) Notice: Subject to any disclaimer, the term of this patent is extended or adjusted under 35 U.S.C. 154(b) by 0 days.

(21) Appl. No.: 15/338,249

(22) Filed: Oct. 28, 2016

(65) Prior Publication Data

US 2017/0134835 A1 May 11, 2017

(30) Foreign Application Priority Data

Nov. 6, 2015 (FR) ...................................... 15 02343

(51) Int. Cl.
*H04B 10/00* (2013.01)
*H04Q 11/00* (2006.01)
*H04B 10/118* (2013.01)

(52) U.S. Cl.
CPC ....... *H04Q 11/0005* (2013.01); *H04B 10/118* (2013.01); *H04Q 2011/0015* (2013.01); *H04Q 2011/0058* (2013.01)

(58) Field of Classification Search
CPC .......... H04B 10/2575; H04B 10/25752; H04B 10/25753; H04B 10/112; H04B 10/114; H04B 10/1121; H04B 10/1129; H04B 10/118; H04B 10/1123; H04J 14/02; H04Q 11/0003; H04Q 11/0005

(Continued)

(56) References Cited

U.S. PATENT DOCUMENTS 5,661,582 A 8/1997 Kintis et al.
5,870,216 A * 2/1999 Brock ................ H04B 7/18504
398/121

(Continued)

FOREIGN PATENT DOCUMENTS

EP 0 871 343 A2 10/1998
FR 2 864 385 A1 6/2005

OTHER PUBLICATIONS

T. Kuri et al. "Dense Wavelength-Division Multiplexing Millimeter-Wave-Band Radio-on-Fibre Signal Transmission With Photonic Downconversion," Journal of Lightwave Technology, vol. 21, No. 6, Jun. 2003, pp. 1510-1517.

(Continued)

*Primary Examiner* — Hanh Phan
(74) *Attorney, Agent, or Firm* — Baker & Hostetler LLP (57) ABSTRACT

A photonic radiofrequency signal cross-connect and frequency conversion device comprises: electronic/optical converters, for transferring radiofrequency input signals to optical carriers; optical combiners for grouping together in one and the same optical path several optical signals generated by the electronic/optical converters; electro-optical modulators for mixing the optical signals being propagated in a same optical path with a respective radiofrequency carrier; optical splitters for splitting the optical signals at the output of the modulators; optical combiners for grouping together the optical signals deriving from different optical paths; and optical/electronic converters, associated with these optical combiners. A space-borne telecommunications payload comprising such a photonic device is also provided.

12 Claims, 7 Drawing Sheets

(58) Field of Classification Search
USPC ..... 398/115, 79, 45, 48, 49, 50, 51, 53, 118, 398/119, 121, 124, 125, 126, 130, 128, 398/116, 183, 186, 159; 455/450, 427, 455/13.2, 12.1; 342/368, 373, 374, 375
See application file for complete search history.

(56) References Cited

U.S. PATENT DOCUMENTS

| | | | | |
|---|---|---|---|---|
| 7,026,988 | B2* | 4/2006 | Stephens | H04J 14/02 342/368 |
| 7,349,634 | B2* | 3/2008 | Sasai | H04B 10/25753 398/115 |
| 2013/0230328 | A1* | 9/2013 | Fan | H04B 10/25759 398/115 |

OTHER PUBLICATIONS

M. E. Manka, "Microwave Photonics for Electronic Warfare Applications," 2008 IEEE, pp. 275-278.

M. Chtioui et al., "Optical Summation of RF Signals," IEEE Transactions on Microwave Theory and Techniques, vol. 55, No. 2, Feb. 2007, pp. 318-326.

C. Dragone, "An N×N Optical Multiplexer Using a Planar Arrangement of Two Star Couplers", IEEE Photonics Technology Letters, vol. 3, No. 9, Sep. 1991, pp. 812-815.

H. Takahashi et al., Transmission Characteristics of Arrayed Waveguide N×N Wavelength Multiplexer,, Journal of Lightwave Technology, vol. 13, No. 3, Mar. 1995, pp. 447-455.

W. Shieh et al., "Microwave Signal Mixing by Using a Fiber-Based Optpelectronic Oscillator for Wavelength-Division Multiplexed Systems," Conference on Optical Fiber, Feb. 16, 1997, pp. 358-359, XP009006333.

Po-Tsung Shih et al., "WDM up-conversion employing frequency quadrupling in optical modulator," Optics Express, vol. 17, No. 3, Feb. 2, 2009, pp. 1727-1733.

Nicolas Mothe et al., "Multichannel Microwave Photonics Signals Summation Device," IEEE Photonics Technology Letters, vol. 23, No. 3, Feb. 1, 2011, pp. 140-142.

* cited by examiner

PHOTONIC RADIOFREQUENCY SIGNAL CROSS-CONNECT AND FREQUENCY CONVERSION DEVICE AND SPACE-BORNE TELECOMMUNICATIONS PAYLOAD COMPRISING SUCH A DEVICE

CROSS-REFERENCE TO RELATED APPLICATIONS

This application claims priority to foreign French patent application No. FR 1502343, filed on Nov. 6, 2015, the disclosure of which is incorporated by reference in its entirety.

FIELD OF THE INVENTION

The invention relates to a radiofrequency signal cross-connect and frequency conversion device, and to a telecommunications payload in particular space-borne, comprising such a device.

BACKGROUND

In the field of telecommunications, it is sometimes necessary to combine together radiofrequency signals deriving from different sources, for example in order to retransmit them to a same recipient, or simply by means of a same antenna. It may be that the spectra of these signals partly or totally overlap; in this case, it is necessary to proceed with frequency conversions to prevent these signals from interfering with one another. Furthermore, frequency conversions may be made necessary, for example, in order to retransmit over a downlink signals received via an uplink. Each frequency conversion operation entails the use of a distinct radiofrequency mixer, driven by a local oscillator. When there are a large number of signals to be handled, that can lead to the implementation of cross-connect and frequency conversion devices that are very complex, and therefore expensive, heavy, bulky and consumers of power (these last three parameters being particularly detrimental in space applications).

Figure 1:
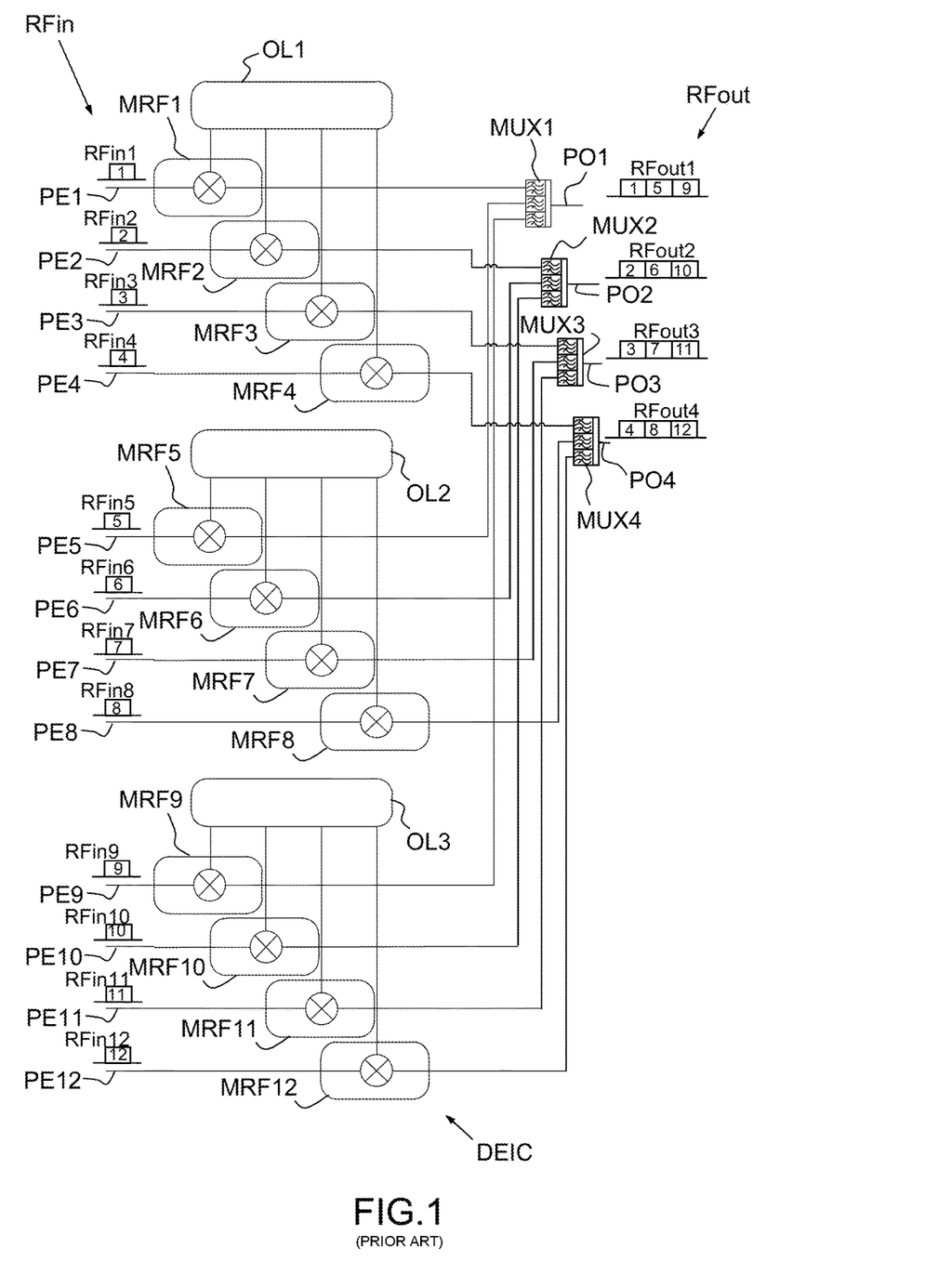
FIG. 1, already described, the functional diagram of a radiofrequency signal cross-connect and frequency conversion device known from the prior art, employing only electronic means.

FIG. 1 schematically illustrates the structure and the operation of a cross-connect and frequency conversion device according to the prior art DEIC. The device has twelve inputs PE1-PE12 (the number 12 is given purely by way of example) for respective radiofrequency signals RFin1-RFin12, collectively designated by the reference RFin. These signals, that are assumed to all have the same frequency fs, or in any case spectra that at least partially overlap, are supplied as input to respective radiofrequency mixers, MRF1-MRF12, which also receive, on another input, radiofrequency signals generated by local oscillators OL1-OL3, operating at different (radio)frequencies, fOL1, fOL2, fOL3. More specifically, the mixers MRF1, MRF2, MRF3 and MRF4 receive, on a first input, the signals RFin1, RFin2, RFin3, RFin4, respectively, and, on a second input, a same signal generated by the local oscillator OL1; the mixers MRF5, MRF6, MRF7 and MRF8 receive, on a first input, the signals RFin5, RFin6, RFin7, RFin8, respectively, and, on a second input, a same signal generated by the local oscillator OL2; and the mixers MRF9, MRF10, MRF11 and MRF12 receive, on a first input, the signals RFin9, RFin10, RFin11, RFin12, respectively, and, on a second input, a same signal generated by the local oscillator OL3.

As is known per se, the signals at the output of the mixers MRF1-MRF4 have a component at a frequency fs+fOL1 and another component at a frequency fs−fOL1; similarly, the signals at the output of the mixers MRF5-MRF8 have components at the frequencies fs±fOL2 and those at the output of the mixers MRF9-MRF12 at the frequencies fs±fOL3.

Four multiplexers MUX1, MUX2 MUX3 are then provided to combine three signals deriving from each of the three groups of mixers (MRF1-MRF4), (MRF5-MRF8), (MRF9-MRF12). These multiplexers are moreover equipped with filters making it possible to reject the spectral components at the difference frequency (fs−fOLi, i=1, 2 or 3) and retain only those at the sum frequency (fs+fOLi, i=1, 2 or 3), or vice-versa.

On the output ports PO1, PO2, PO3, PO4 of the multiplexers (and of the device DEIC) there are four "composite" radiofrequency signals RFout1, RFout2, RFout3, RFout4, each consisting of the juxtaposition of three "elementary" signals obtained by frequency-shifting of three respective input signals. Thus, the output signal RFout1 groups together (with frequency shift) the signals RFin1, RFin5 and RFin9; the output signal RFout2 groups together RFin2, RFin6, RFin10; the output signal RFout3 groups together RFin3, RFin7, RFin11; and the output signal RFout4 groups together RFin4, RFin8, RFin12. The reference symbols 1 to 12 make it possible to associate the input signals with the corresponding composite output signals.

The main drawback with the device DEIC is that, to process N radiofrequency signals, N mixers are required, which can rapidly lead to an unacceptable complexity.

The invention aims to remedy this drawback.

SUMMARY OF THE INVENTION

According to the invention, this aim is achieved by virtue of a photonic processing of the signals. Physically, in a device according to the invention, the input radiofrequency signals are transferred to optical carriers at different wavelengths. Then, the signals which have to undergo a same frequency shift can be grouped together and be modulated together, by a same optical mixer, while keeping their individuality by virtue of the wavelength diversity of their optical carriers. Next, the splitting then recombining operations are performed by optical means, and a transfer in the radiofrequency domain is performed only at the output of the device.

Photonic devices making it possible to process radiofrequency signals have already been proposed. However, these devices known from the prior art do not make it possible to implement the functionalities of the device DEIC of FIG. 1 and/or reduce the complexity thereof.

For example:

The article by T. Kuri et al. "Dense Wavelength-Division Multiplexing Millimeter-Wave-Band Radio-on-Fibre Signal Transmission With Photonic Downconversion", Journal of Lightwave Technology, Vol. 21, No. 6, June 2003, describes a "radio-on-fibre" system in which multiple radio signals are transferred to optical carriers at different wavelengths, transported by respective optical fibres to a multiplexer, then multiplexed in a same optical fibre and transported to a remote central station where they are frequency-converted by a single electro-optical mixer, before being demultiplexed. This article does not describe a signal cross-connect and recombination device involving the use of different frequency conversions, but a simple link over a wide geographic area. Thus, it does not involve rearranging, in the space and frequency domains, multiple elementary input signals as composite output signals, as in the case of DEIC and the invention.

The article by P-T Shih et al "WDM up-conversion employing frequency quadrupling in optical modulator", Optics Express, Vol. 17, No. 3, 2 Feb. 2009, also describes a "radio-on-fibre" system in which several wavelength-multiplexed signals share a same electro-optical mixer.

The article by M. E. Manka "Microwave Photonics for Electronic Warfare Applications" describes airborne electronic warfare systems in which radiofrequency signals deriving from different antennas are transferred to optical carriers at different wavelengths, transported by optical fibre to a multiplexer, multiplexed, frequency-converted by means of a single electro-optical mixer, before being demultiplexed to be then processed individually. Here again, it does not involve rearranging elementary input signals and grouping them together as composite output signals, as in the case of DEIC and of the invention.

The document U.S. Pat. No. 5,661,582 describes a photonic radiofrequency signal interconnect device intended to be used in a space-borne telecommunications payload. The device does not provide, at its outputs, composite signals obtained by frequency conversion and grouping together of the signals present at its outputs. Thus, it performs functions quite different from those of the device DEIC and of the invention.

The document FR 2 864 385 describes a photonic radiofrequency signal space-frequency cross-connect device, intended to be used in a space-borne telecommunications payload. The device uses electro-optical mixers to perform frequency conversions and an optical interconnect network. Contrary to the case of the device DEIC of FIG. 1, each optical mixer is used to mix a single input radiofrequency signal with several local oscillator signals simultaneously. Thus, the device described by this document does not meet the same need and performs a different processing to the device DEIC.

Thus, none of these documents makes it possible to implement the functionalities of the device DEIC of FIG. 1 with lesser complexity.

One subject of the invention, making it possible to solve this problem, is a photonic radiofrequency signal cross-connect and frequency conversion device comprising:
  a plurality of inputs for respective radiofrequency signals;
  a plurality of electronic/optical converters, each said converter being associated with one said input and being configured to generate an optical signal by transferring one said radiofrequency signal to an optical carrier at a respective wavelength;
  at least one first set of optical combiners, each optical combiner of said first set being configured to group together a plurality of said optical signals in a same optical path;
  a plurality of electro-optical modulators associated with respective optical paths, each said electro-optical modulator being configured to mix all of the optical signals being propagated in the corresponding optical path with a respective radiofrequency carrier;
  a plurality of optical splitters configured to split the optical signals, mixed by said electro-optical modulators with their respective radiofrequency carrier, being propagated in each of said optical paths;
  a second set of optical combiners, each optical combiner of said second set being configured to group together a plurality of optical signals deriving from different optical paths; and
  a plurality of optical/electronic converters, each said converter being associated with an optical combiner of said second set and being configured to convert the composite optical signal deriving from the respective optical combiner into an output radiofrequency signal;
  said electronic-optical converters and optical combiners of said second set being configured in such a way that all the optical signals being propagated along a same optical path, and all the optical signals grouped together by a same optical combiner of the second set, have optical carriers of different wavelength.

According to particular embodiments of such a device:

Each said electronic/optical converter can be configured to generate one said optical signal by transferring one said radiofrequency signal to an optical carrier at one said different wavelength from that of the other converters.

The device can also comprise a plurality of local oscillators operating at different radiofrequencies and configured to drive respective optical mixers.

At least some of said electronic/optical converters can be linked by respective optical switches to respective inputs of several optical combiners of said first set, and at least some outputs of at least some optical splitters are linked by respective optical switches to respective inputs of several optical combiners of said second set. More particularly, all said electronic/optical converters can be linked by respective optical switches to respective inputs of all the optical combiners of said first set, and all the outputs of all the optical splitters can be linked by respective optical switches to respective inputs of all the optical combiners of said second set.

Said plurality of optical splitters and said second set of optical combiners can be implemented by means of an N×N optical multiplexer.

Said electronic-optical converters can comprise semiconductor lasers configured to be modulated directly by the radiofrequency signals present at the respective inputs of the device.

As a variant, said electronic-optical converters can comprise semiconductor lasers with integrated electro-optical modulator.

Another subject of the invention is a space-borne telecommunications payload comprising such a photonic radiofrequency signal cross-connect and frequency conversion device.

According to particular embodiments:

Such a payload can comprise a plurality of reception channels for radiofrequency signals having radiofrequency carriers, said reception channels being linked to respective inputs of said photonic radiofrequency signal cross-connect and frequency conversion device; and a plurality of transmission channels for radiofrequency signals having carriers of different frequencies, said transmission channels being linked to respective optical/electronic converters of said photonic radiofrequency signal cross-connect and frequency conversion device.

Such a payload can comprise a digital radiofrequency signal processor having outputs for radiofrequency signals having carriers of the same frequency, said outputs being linked to respective inputs of said photonic radiofrequency signal cross-connect and frequency conversion device; and a plurality of transmission channels for radiofrequency signals having carriers of different frequencies, said transmission channels being linked to respective optical/electronic converters of said photonic radiofrequency signal cross-connect and frequency conversion device.

Such a payload can comprise an active antenna capable of operating in reception mode, having outputs for radiofrequency signals in a same band, said outputs being linked to respective inputs of said photonic radiofrequency signal cross-connect and frequency conversion device; and a baseband processor having inputs linked to respective optical/electronic converters of said photonic radiofrequency signal cross-connect and frequency conversion device.

The term "radiofrequency" describes frequencies of between approximately 1 MHz and 100 GHz—therefore including microwaves (1 GHz and above).

The term "photonic" describes the techniques and the devices that make it possible to generate, transmit, manipulate and detect "light", that is to say electromagnetic radiation of wavelength between approximately 200 nm and 3 μm.

BRIEF DESCRIPTION OF THE DRAWINGS

Figure 2:
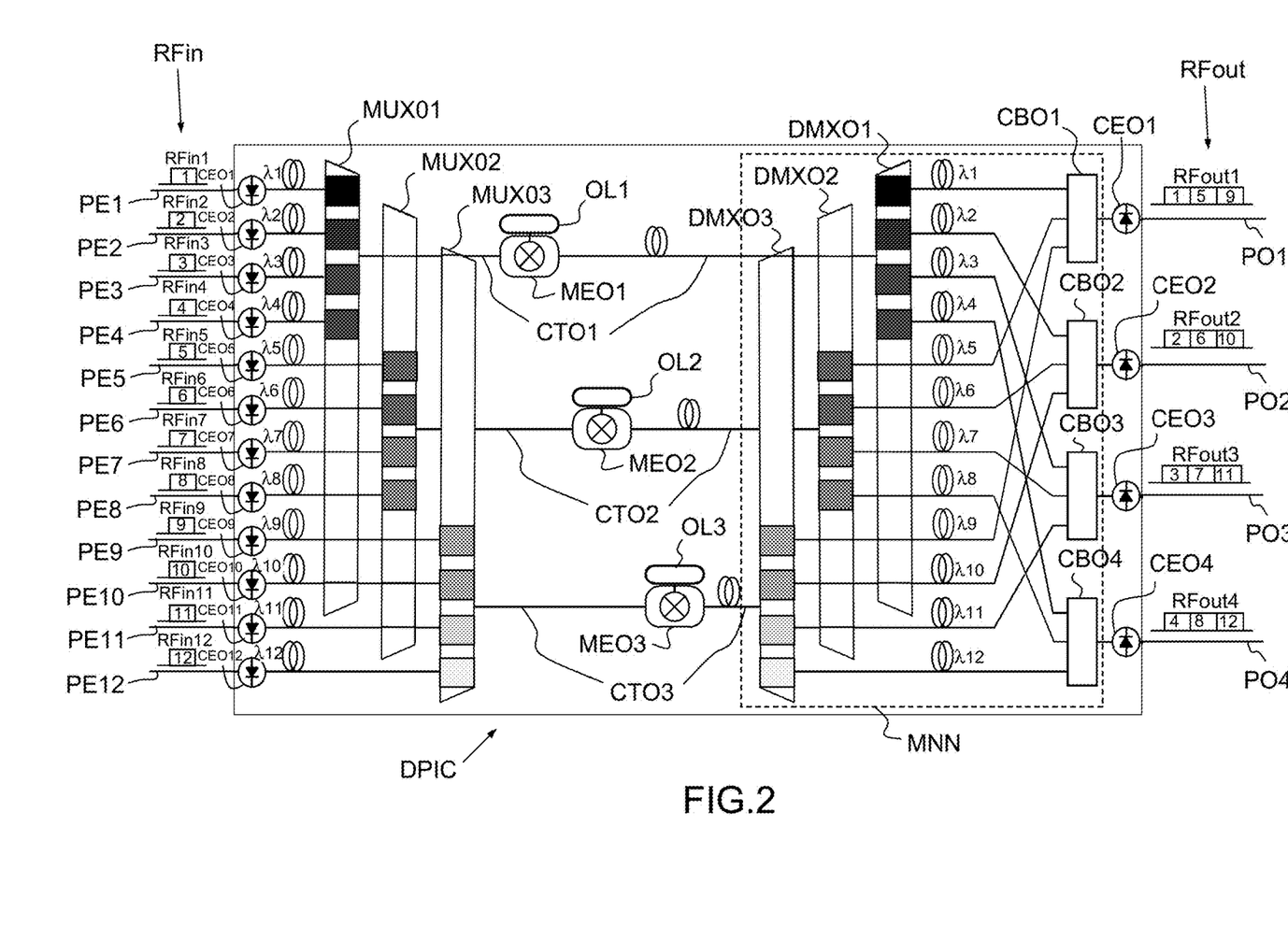
FIG. 2, the functional diagram of a photonic radiofrequency signal cross-connect and frequency conversion device according to a first embodiment of the invention.

Other features, details and advantages of the invention will emerge on reading the description given with reference to the attached drawings given by way of example and which represent, respectively:

FIG. 2 illustrates the structure and the operation of a photonic cross-connect and frequency conversion device DPIC according to a first embodiment of the invention.

DETAILED DESCRIPTION

As in the case of the device DEIC, the case considered is of a device receiving, at its inputs, radiofrequency signals having a same central frequency $f_s$; that is not however essential.

The radiofrequency signals RFin1-Rfin12 present at the inputs PE1-PE12 of the device are transferred to respective optical carriers at wavelengths $\lambda_1$-$\lambda_{12}$ by electrical-optical converters CEO1-CEO12. That means that optical carriers at the wavelengths $\lambda_1$-$\lambda_{12}$ are modulated, for example in amplitude, each by a respective radiofrequency signal; in other words, the envelope of each optical signal corresponds to one of the input radiofrequency signals. Typically, the wavelengths $\lambda_1$-$\lambda_{12}$ can be located in the near-infrared (1200-1600 nm). The electrical-optical converters are generally semiconductor lasers, and the modulation of the optical signals can be obtained directly, that is to say by modulating the power supply current of these lasers. It is also possible to use semiconductor lasers with an integrated electro-optical modulator).

The electrical-optical converters are linked to a set of optical multiplexers (also called "WDM devices", in which the acronym WDM stands for "wavelength division multiplexing") by respective optical fibres. More specifically, electrical-optical converters (CEO1-CEO4) forming a first group are linked to a first multiplexer MUXO1; electrical-optical converters (CEO5-CEO8) forming a second group are linked to a second multiplexer MUXO2; and electrical-optical converters (CEO9-CEO12) forming a third group are linked to a third multiplexer MUXO3. Each of these multiplexers has a single output, linked to an optical fibre. Thus, the optical signals at the wavelengths $\lambda_1$, $\lambda_2$, $\lambda_3$ and $\lambda_4$ are propagated along the optical fibre CTO1 linked to the output of the multiplexer MUXO1, the optical signals at the wavelength s $\lambda_5$, $\lambda_6$, $\lambda_7$ and $\lambda_8$ are propagated along the optical fibre CTO2 linked to the output of the multiplexer MUXO2, the optical signals at the wavelengths $\lambda_9$, $\lambda_{10}$, $\lambda_{11}$ and $\lambda_{12}$ are propagated along the optical fibre CTO3 linked to the output of the multiplexer MUXO3. The signals being propagated along a same optical fibre maintain their individuality by virtue of the fact that they have different wavelengths.

Each optical fibre CTO1, CTO2, CTO3 brings the optical signals deriving from a multiplexer to an optical input of a respective electro-optical mixer, MEO1, MEO2, MEO3, each also receiving, on another RF input, a radiofrequency signal generated by a respective local oscillator OL1, OL2, OL3. In general, the signals generated by these local oscillators have different frequencies. Before the mixer, each optical signal has an envelope corresponding to a signal RFin of centre frequency fs; after the mixer, the envelope has components at the centre frequencies fs±n*fOLi, with fOLi=fOL1, fOL2, fOL3—frequency of the local oscillator associated with the mixer concerned, the parameter "n" taking integer values. Depending on the type of mixer, the setting of its operating point and the filtering at the device output, one of these components will be prioritized.

In a preferential configuration, the mixers are polarized to an optical transmission minimum, which has the effect of modulating the optical carriers at twice the frequency of the local oscillator fOLi, and therefore of prioritizing the components fs±2*fOLi. An optical or RF filtering depending on the case then makes it possible to select the desired component, for example fs+2*fOLi, and reject that which is not desired as fs−2*fOLi (or vice-versa).

A frequency conversion (and more specifically a frequency translation or shift) of all the signals is therefore performed. Contrary to the case of the electronic device DEIC, however, the conversion is performed by using only three mixers, one for each local oscillator. By virtue of the wavelength multiplexing, all the signals grouped together to undergo a same frequency shift can share a same mixer.

The optical fibres (still designated by the references CTO1, CTO2, CTO3) at the output of the mixers conduct the modulated optical signals to respective optical demultiplexers DMXO1, DMXO2, DMXO3 which split the signals of different wavelength. Thus, at the output of this set of demultiplexers, there are twelve independent optical signals which differ from those generated by the input electrical-optical converters CEO1-CEO12 only by the fact that their envelopes have undergone frequency shifts (because each mixer generates components frequency-shifted upwards—fs+n*fOLi—and components shifted downwards—fs−n*fOLi).

Next, these signals are grouped together in such a way that each group contains only optical signals deriving from different mixers, and therefore having undergone different frequency shifts. In the example of the figure, there are four groups of three signals each, each group containing exactly one signal deriving from the mixer MEO1, one signal deriving from the mixer MEO2, and one signal deriving from the mixer MEO3. In this example, furthermore, the grouping together is obtained by virtue of a set of optical combiners CBO1, CBO2, CBO3.

The terms "combiner" and "splitter" are used generally to designate any device suitable for combining/splitting optical signals; the multiplexers and the demultiplexers are therefore considered as particular cases of combiners and splitters, respectively.

The recombining of the signals can therefore be done in different ways, by using, notably and non-exclusively, the following devices:
  fibre couplers obtained by fusion/drawing; these components are much simpler than the multiplexers, but they exhibit higher losses and do not ensure any filtering function;
  wavelength multiplexers which optimize the performance levels in terms of losses and filtering;
  detectors with multiple optical inputs which comprise an element making it possible to concentrate, in the optical domain, several beams, and illuminate a single photodiode; such components are for example described in the article by N. Mothe and P. Di Bin, "Multichannel Microwave Photonics Signals Summation Device", IEEE Photonics Technology Letters, Vol. 23, NO. 3, 1 Feb. 2011;
  networks of progressive RF wave detectors, as described in the article by M. Chtioui et al., "Optical Summation of RF Signals", IEEE Transactions On Microwave Theory And Techniques, Vol. 55, No. 2, February 2007, and which rely on the distribution of several photodiodes along a high-impedance RF transmission line and the gradual construction of a single RF output signal.

It will be noted that the demultiplexers DMXO1-DMXO3 could be replaced by simple optical fibre splitters (here also, the gain in simplicity is obtained at the price of higher losses and of the waiving of a filtering function). It is however preferable for each optical signal to pass through at least one multiplexer or demultiplexer, to ensure the spectral purity thereof; otherwise, optical filters will have to be provided at a level in the device between the mixers and the optical-electrical conversion.

It will also be noted that the functionality of splitting and recombining of the signals respectively by demultiplexers and multiplexers can, under certain conditions, be performed advantageously by one and the same integrated and passive device known as N×N multiplexer or wavelength router, as described in the articles by C. Dragone, "An N×N Optical Multiplexer Using a Planar Arrangement of Two Star Couplers", IEEE Photonics Technology Letters, Vol. 3, No. 9, September 1991, and by H. Takahashi et al., "Transmission Characteristics of Arrayed Waveguide N×N Wavelength Multiplexer", Journal Of Lightwave Technology, Vol. 13, No. 3, March 1995. In FIG. 2, the reference MNN designates the subset of demultiplexers DMXO1, DMXO2, DMXO3 and combiners CBO1, CBO2, CBO3 and CBO4, which could be replaced by a device of N×N multiplexer type (with N=4, of which only three of its four inputs would be used), under certain wavelength allocation conditions. More particularly, it is possible to use, for the optical carriers, N wavelengths which are repeated with a circular permutation. In the case of FIG. 2, it is therefore possible to use a 4×4 multiplexer device with a wavelength allocation of this type: $\lambda_1 \neq \lambda_2 \neq \lambda_3 \neq \lambda_4$; $\lambda_5 = \lambda_4$; $\lambda_6 = \lambda_1$; $\lambda_7 = \lambda_2$; $\lambda_8 = \lambda_3$; $\lambda_9 = \lambda_3$; $\lambda_{10} = \lambda_4$; $\lambda_{11} = \lambda_1$; $\lambda_{12} = \lambda_2$.

It will finally be noted that it is possible to associate several of these means to produce the recombining function. For example, to recombine n×m optical signals (n, m integers), it is possible to use 'm' fibre couplers with 'n' inputs and one output, of which the 'm' outputs are coupled to respective inputs of a detector with multiple optical inputs.

The "composite" optical signals obtained at the output of the combiners are converted into the radiofrequency domain by means of optical-electrical converters COE1, COE2, COE3 (typically photodiodes). As in the case of the device DEIC, there are, on the output ports of the photonic device DPIC, four "composite" radiofrequency signals RFout1, RFout2, RFout3, RFout4, each consisting of the overlaying of three "elementary" signals. More specifically, the output signal RFout1 groups together (with frequency shift) the signals RFin1, RFin5 and RFin9; the output signal RFout2 groups together RFin2, RFin6, RFin10; the output signal RFout3 groups together RFin3, RFin7, RFin11; and the output signal RFout4 groups together RFin4, RFin8, RFin12. Contrary to the DEIC case, however, these composite signals contain both upward frequency shifted components and downward frequency shifted components. The filtering (which in DEIC was handled by the output multiplexers) is performed downstream of the DPIC output ports.

Figure 3:
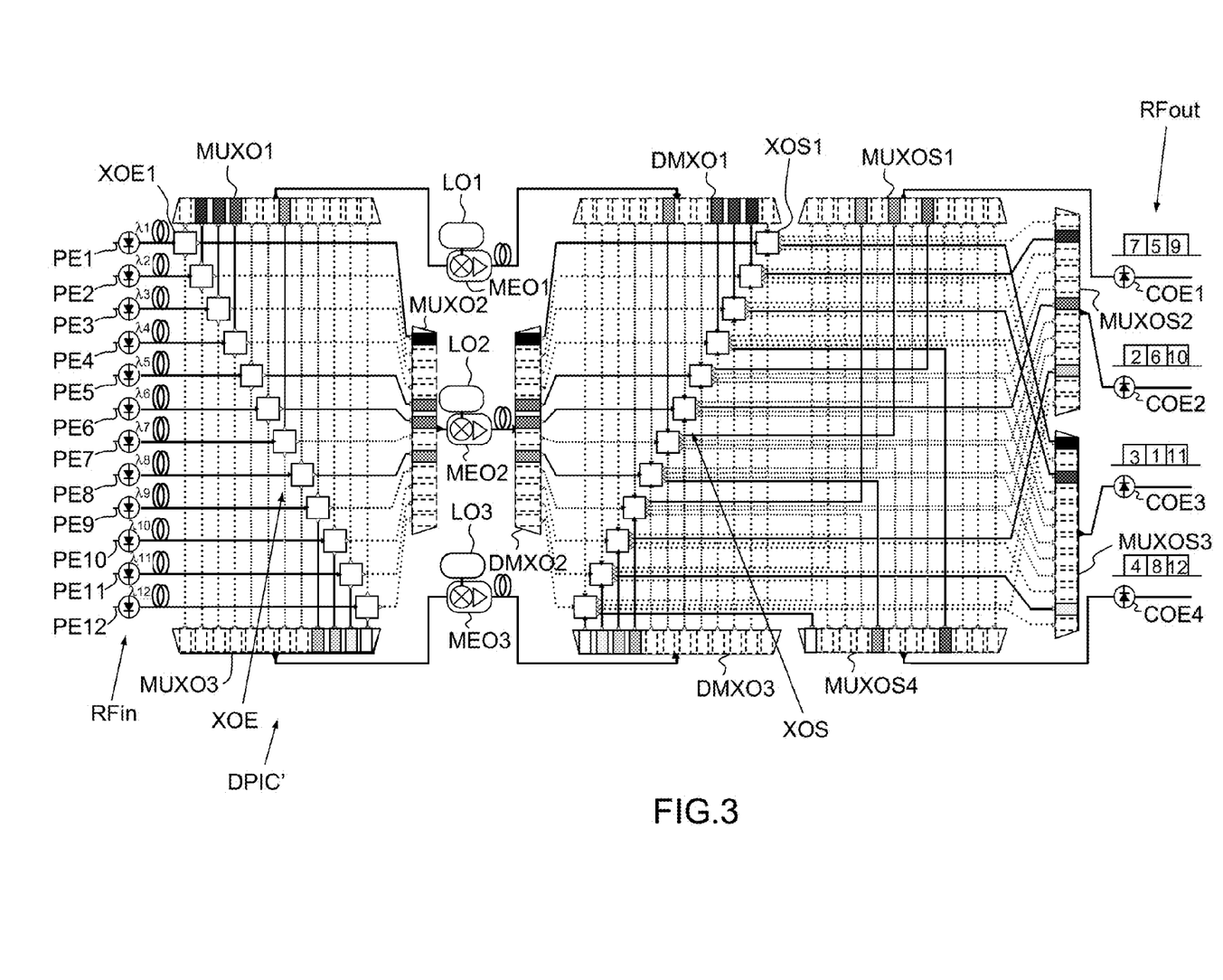
FIG. 3, the functional diagram of a photonic radiofrequency signal cross-connect and frequency conversion device according to a second embodiment of the invention.

FIG. 3 illustrates the structure and the operation of a photonic cross-connect and frequency conversion device DPIC' according to a second embodiment of the invention. The device DPIC' is differentiated from that of FIG. 2 essentially in that
  each electrical-optical converter is linked to all the multiplexers MUXO1-MUXO2 by an optical switch with one input and three outputs (the reference XOE generally designates these 12 switches; the reference XOE1 more specifically designates the switch linked to the first electrical-optical switch; the other switches are not designated by specific references to avoid overloading the figure); and that
  each output of each optical demultiplexer is linked to an input of each of the output optical combiners (which are here implemented by multiplexers MUXOS1, MUXOS2, MUXOS3, MUXOS4) by respective optical switches with one input and four outputs (general reference XOS; only the switch XOS1 is identified by a specific reference symbol).

The use of the two sets of optical switches XOE, XOS makes it possible to route the signals independently and very flexibly; it will be possible to have, on each of the output ports, any combination of three input signals, frequency-shifted. In the example of FIG. 3, for example, the signals 1 and 7 have swapped their positions compared to the fixed configuration of FIG. 2.

The fact that, in the device of FIG. 3, the operation of grouping together of the optical signals is performed by multiplexers rather than by combiners of simpler type is unrelated to the use of the optical switches XOE, XOS.

It is also possible to implement a device with more limited routing capacities, in which case only some of the switches XOE, XOS could be present and/or they could have fewer outputs than there are combiners downstream.

Figure 4:
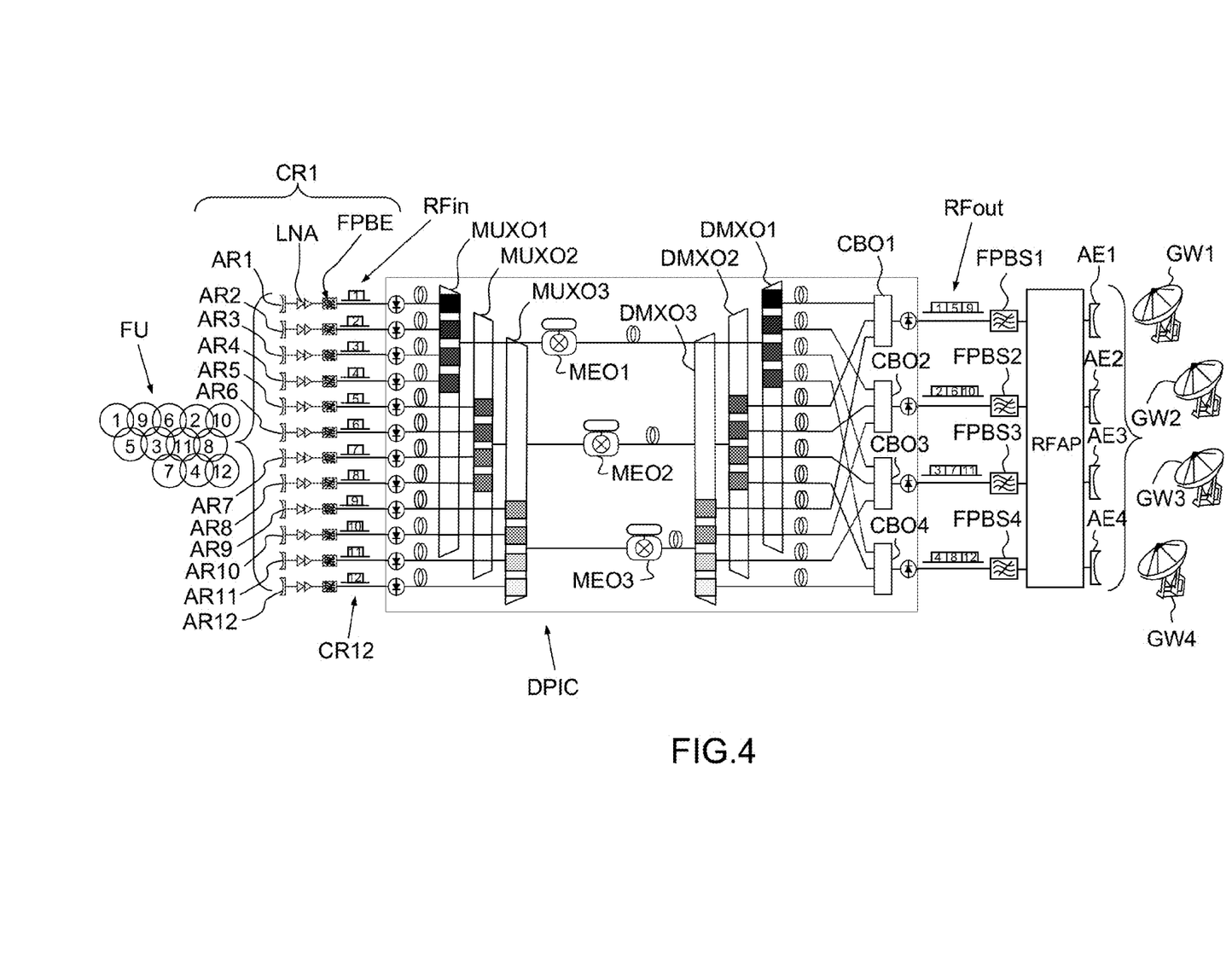
FIG. 4, the functional diagram of a space-borne telecommunications payload according to a third embodiment of the invention.

FIG. 4 illustrates a space-borne satellite telecommunications payload using a device DPIC described above with reference to FIG. 2 (it would also be possible to use the device DPIC' of FIG. 3). This is a multiple-beam payload implementing a return link. In this application, 12 user beams FU, possibly being able to be at the same frequency but spatially separated, are picked up by respective antennas AR1-AR12 operating in reception mode; the signals thus acquired are amplified and filtered (each antenna with a low-noise amplifier and a filter forms a reception channel; only the first and last channels are identified by reference symbols—CR1 and CR12—in order to avoid overloading the figure). Then, these signals are supplied as input to the device DPIC. At the output ports of this device, four composite signals are recovered, each grouping together three frequency-shifted input signals. These signals are supplied as input to respective transmission channels (bandpass filters FPBS1-FPBS4; power amplifiers RFAP; antennas operating in transmission mode AE1-AE4) which ensure the transmission thereof to respective gateways GW1-GW4 located on the ground. In this application, the frequency-shifting has a dual function: on the one hand, it makes it possible to group together the signals, on the other hand, it is necessary because different spectral bands are assigned to the uplinks and to the downlinks.

Figure 5:
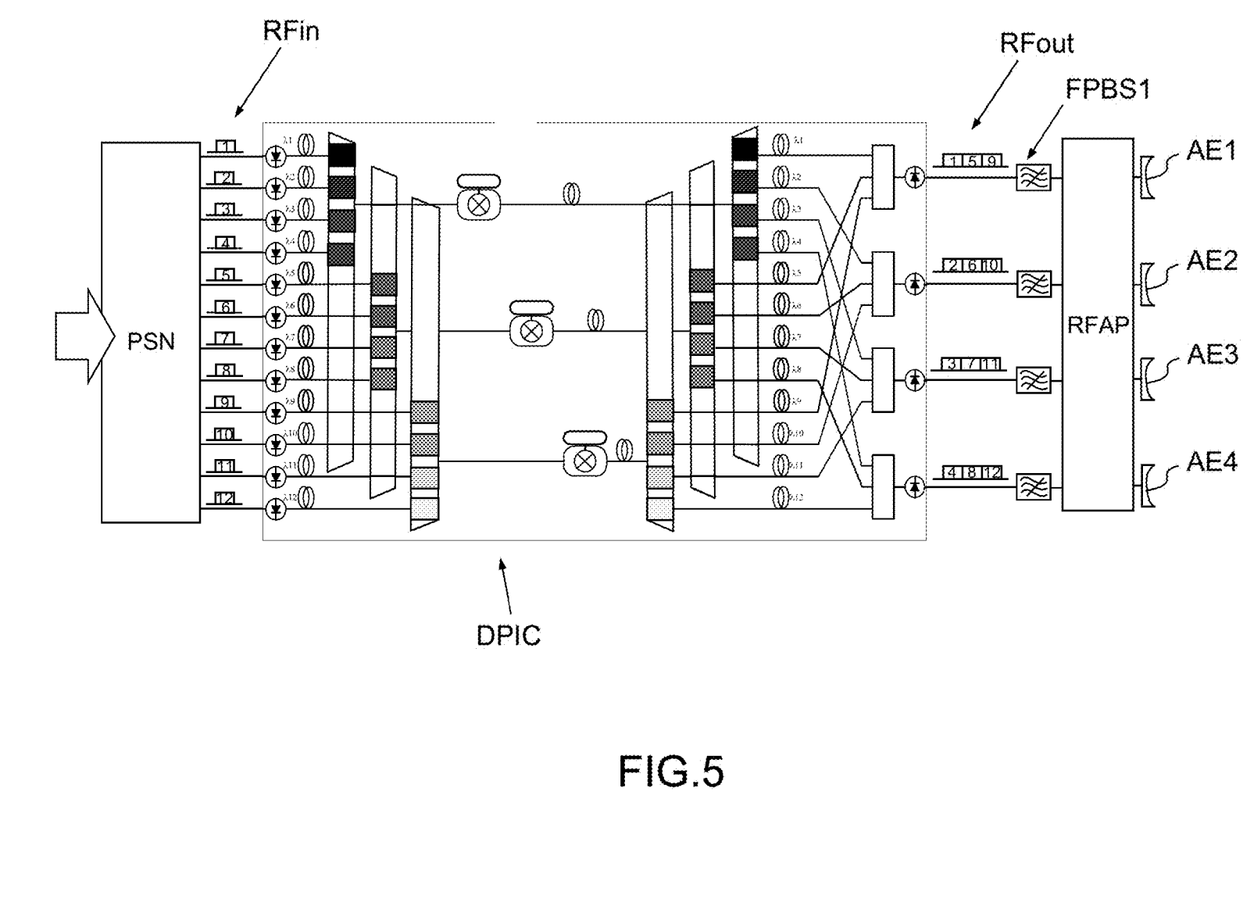
FIG. 5, the functional diagram of a space-borne telecommunications payload according to a fourth embodiment of the invention.

FIG. 5 illustrates another space-borne satellite telecommunications payload using a device DPIC described above with reference to FIG. 2 (here again it would be perfectly possible to use the device DPIC' of FIG. 3). This application is similar to that of FIG. 4, except that the input signals do not originate from acquisition channels but are generated, at an intermediate frequency, by a digital signal processor PSN.

Figure 6A:
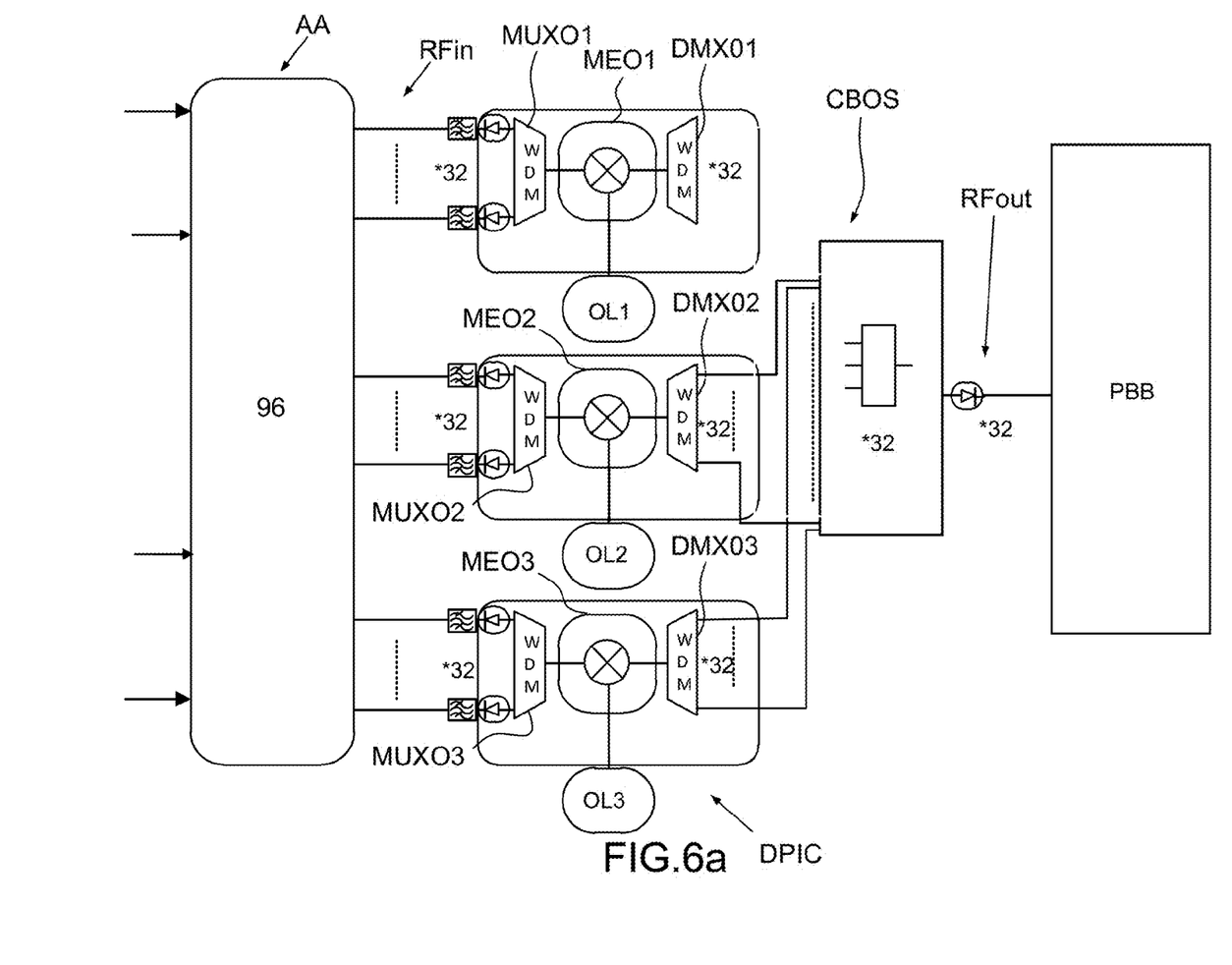
FIG. 6a, the functional diagram of a space-borne telecommunications payload according to a fifth embodiment of the invention and, FIG. 6b, the functional diagram of a space-borne telecommunications payload according to the prior art, employing only electronic means.

FIG. 6a illustrates yet another space-borne satellite telecommunications payload using a device DPIC described above with reference to FIG. 2 (here again, it would be perfectly possible to use the device DPIC' of FIG. 3). The application considered in this embodiment relates to an active antenna AA, operating in reception mode, and having 96 output ports. From each of these ports, a signal is extracted with a bandwidth of 50 MHz and a centre frequency lying between 1 and 2 GHz. These signals must be converted into baseband to be processed by a baseband digital processor PBB. A processor with 96 inputs would be extremely complex and costly to produce; moreover, such a processor generally has a band wider than 50 MHz (200 MHz for example). It is therefore advantageous to group together the signals three-by-three after having translated them into the 0-200 MHz band. These operations of frequency conversion and grouping together are performed by a device DPIC similar to that of FIG. 2, but using three electro-optical mixers each operating on 32 optical signals. The reference CBOS designates all the optical combiners.

Figure 6B:
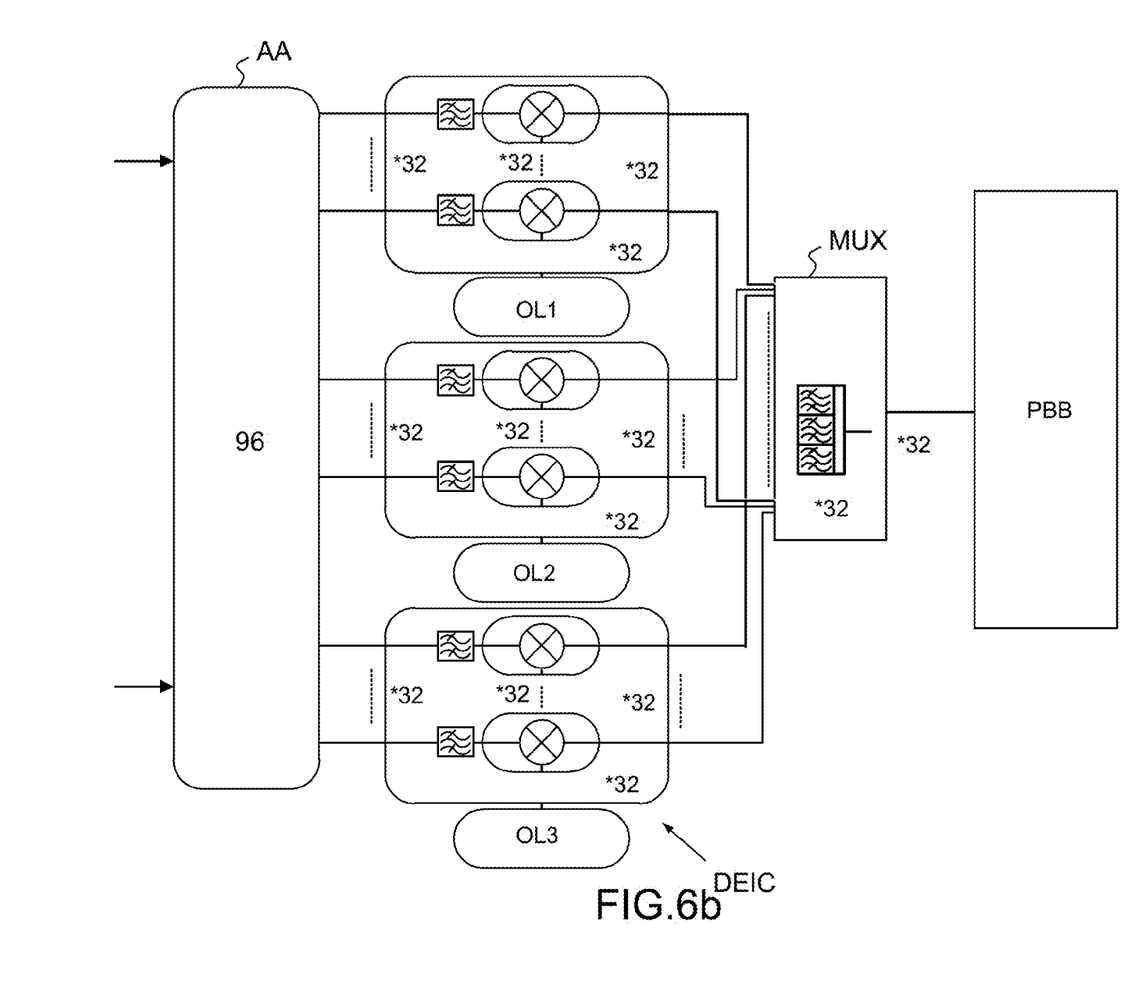

For comparison, FIG. 6b illustrates a device DEIC performing the same functionality by purely electronic means. It employs 96 radiofrequency mixers. The technical and economic advantage obtained by the invention can therefore be seen.

In all the examples (except the last), the case of 12 input signals, 3 local oscillators and 4 composite output signals, each comprising 3 elementary signals, has been considered. It can easily be understood that this is a nonlimiting example, and that the invention applies to any number of input and output signals, and of local oscillators. It is, moreover, not necessary for all the composite output signals to comprise the same number of elementary signals.

Moreover, particularly if signal routing flexibility is not required, it is not essential for all the optical carriers to have different wavelengths: it is only necessary for the optical signals grouped together by the combiners of the first and of the second sets to have carriers with different wavelengths. In the diagram of FIG. 2, that can be obtained, among others, with just four different wavelengths, by performing a circular permutation on each group of four input signals. For example, a wavelength $\lambda_1$ can be assigned to the signals RFin1, RFin6, RFin11; another wavelength $\lambda_2$ to the signals RFin2, RFin7, RFin12; a third wavelength $\lambda_3$ to the signals RFin3, RFin8, RFin9; and a fourth wavelength $\lambda_4$ to the signals RFin4, RFin5, RFin10.

The invention has been described by referring to certain embodiments, but variants are possible, notably with regard to the technologies implemented by the different components.

The electro-optical mixers MEO1-MEO3 can for example be intensity modulators of the Mach-Zehnder type and be produced in lithium niobate, or on semiconductor substrates such as indium phosphide (InP), gallium arsenide (AsGa) or silicon. Other embodiments can be envisaged. There is even no need for the mixers to be based on an electro-optical effect (Pockels effect); as a variant, it would be possible, by way of example, to use electro-absorption modulators, or carrier injection ring modulators. It would also be possible to use phase modulators and polarization modulators subject to the condition of placing at the output of the optical elements, respectively, optical filters and polarizers, which convert the phase and polarization modulations into intensity modulation. All these types of mixers can be qualified as "electro-optical", regardless of their operating principle, because they make it possible to mix an optical signal and a signal of electrical nature.

As in FR 2 864 385, it is also possible to use electro-optical mixers to mix each optical signal with several local oscillator signals at different frequencies. In particular, it is possible to use RF dual-drive mixers to mix the optical signals with at least two different local oscillator signals.

The possibility of using combiners/splitters that are simpler than multiplexers/demultiplexers has already been discussed. It will be noted that the recombining of the optical signals at the output of the device can be obtained in an even simpler way, by directly coupling several optical fibres to each optical-electrical converter.

The optical switches XOE, XOS can be of different types: electromechanical, micro-opto-electromechanical (MO-EMS), electro-optical, acousto-optical, thermo-optical, liquid crystal, etc.

Only embodiments using optical fibres for the transmission of optical signals have been considered. However, some of these fibres—even, at least in principle, all of them—can be replaced by planar waveguides in the context of a partially or totally integrated embodiment. It is even possible to envisage exploiting free propagation paths. In fact, any means making it possible to define optical paths between the different components of the device can be suitable for implementing the invention.

Finally, a device according to the invention lends itself to applications other than that envisaged above, with reference to FIGS. 4-6a. In particular, the use of the device is not limited to space applications.

The invention claimed is:

1. A photonic radiofrequency signal cross-connect and frequency conversion device comprising:
a plurality of inputs for respective radiofrequency signals;
a plurality of electronic/optical converters, each electronic/optical converter being associated with one said input and being configured to generate an optical signal by transferring one said radiofrequency signal to an optical carrier at a respective wavelength;
at least one first set of a plurality of optical combiners, each optical combiner of said first set being configured to group together a plurality of said optical signals in a same optical path;

a plurality of local oscillators configured for generating radio-frequency carriers at respective frequencies;

a plurality of electro-optical modulators associated with respective optical paths, each said electro-optical modulator being configured to mix all of the optical signals being propagated in the corresponding optical path with the radiofrequency carrier generated by a respective local oscillator;

a plurality of optical splitters configured to split the optical signals, mixed by said electro-optical modulators with their respective radiofrequency carrier, being propagated in each of said optical paths;

a second set of optical combiners, each optical combiner of said second set being configured to group together a plurality of optical signals deriving from different optical paths and mixed with different radiofrequency carriers;

a plurality of optical/electronic converters, each optical/electronic converter being associated with a respective optical combiner of said second set and being configured to convert a composite optical signal deriving from the respective optical combiner into an output radiofrequency signal; and said electronic/optical converters and optical combiners of said second set being configured in such a way that all the optical signals being propagated along a same optical path and mixed with a same radiofrequency carrier, and all the optical signals grouped together by a same optical combiner of the second set, have optical carriers of different wavelength.

2. The device according to claim 1, wherein each said electronic/optical converter is configured to generate one said optical signal by transferring one said radiofrequency signal to an optical carrier at one said different wavelength from that of the other converters.

3. The device according to claim 1 wherein said local oscillators operate at different radiofrequencies.

4. The device according to claim 1, wherein at least some of said electronic/optical converters are linked by respective optical switches to respective inputs of several optical combiners of said first set, and at least some outputs of at least some optical splitters are linked by respective optical switches to respective inputs of several optical combiners of said second set.

5. The device according to claim 4, wherein all said electronic/optical converters are linked by respective optical switches to respective inputs of all the optical combiners of said first set, and all the outputs of all the optical splitters are linked by respective optical switches to respective inputs of all the optical combiners of said second set.

6. The device according to claim 1, wherein said plurality of optical splitters and said second set of optical combiners are implemented by means of an N×N optical multiplexer.

7. The device according to claim 1, wherein said electronic/optical converters comprise semiconductor lasers configured to be modulated directly by the radiofrequency signals present at the respective inputs of the device.

8. The device according to claim 1, wherein said electronic-optical converters comprise semiconductor lasers with integrated electro-optical modulator.

9. A space-borne telecommunications payload comprising a photonic radiofrequency signal cross-connect and frequency conversion device according to claim 1.

10. The payload according to claim 9, comprising:
a plurality of reception channels for radiofrequency signals having radiofrequency carriers, said reception channels being linked to respective inputs of said photonic radiofrequency signal cross-connect and frequency conversion device; and
a plurality of transmission channels for radiofrequency signals having carriers of different frequencies, said transmission channels being linked to respective optical/electronic converters of said photonic radiofrequency signal cross-connect and frequency conversion device.

11. The payload according to claim 9, comprising:
a digital radiofrequency signal processor having outputs for radiofrequency signals having carriers of the same frequency, said outputs being linked to respective inputs of said photonic radiofrequency signal cross-connect and frequency conversion device; and
a plurality of transmission channels for radiofrequency signals having carriers of different frequencies, said transmission channels being linked to respective optical/electronic converters of said photonic radiofrequency signal cross-connect and frequency conversion device.

12. The payload according to claim 9, comprising:
an active antenna capable of operating in reception mode, having outputs for radiofrequency signals in a same band, said outputs being linked to respective inputs of said photonic radiofrequency signal cross-connect and frequency conversion device; and
a baseband processor having inputs linked to respective optical/electronic converters of said photonic radiofrequency signal cross-connect and frequency conversion device.

* * * * *